Oct. 26, 1937.                R. F. JAMES                2,096,746
                        FOOD PRESERVING APPARATUS
                        Filed Sept. 28, 1935          3 Sheets-Sheet 1
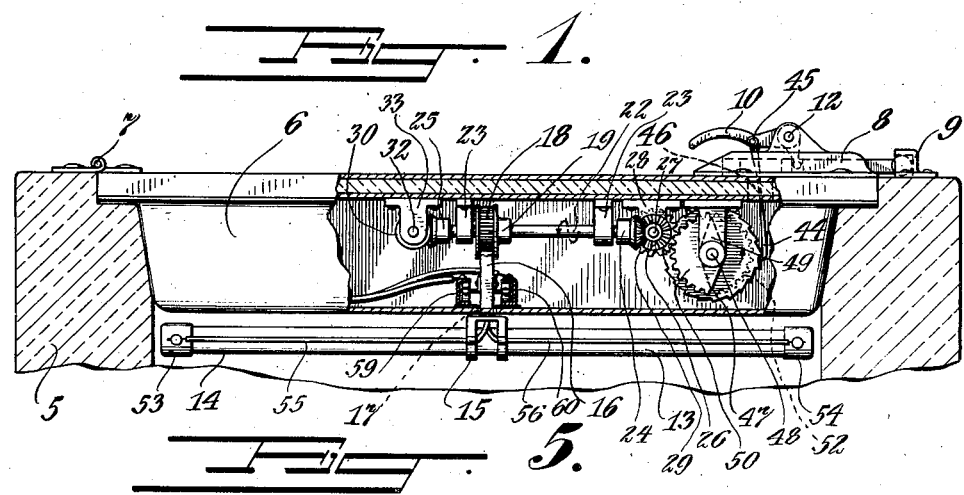
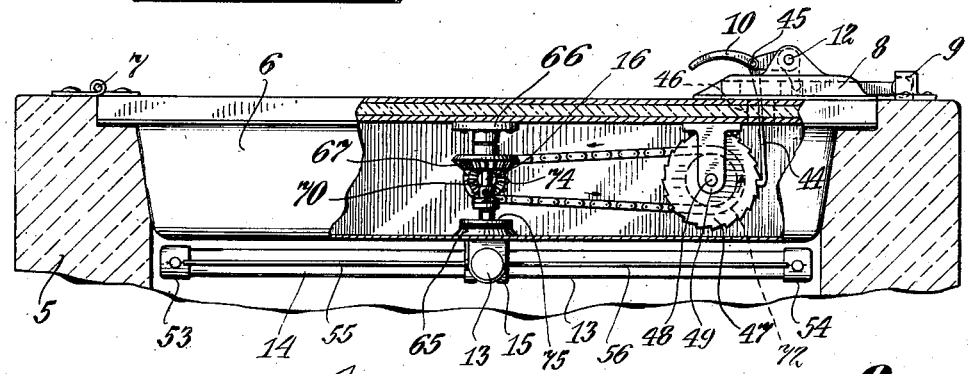
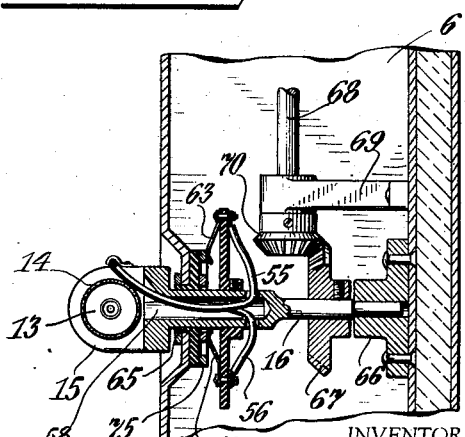
INVENTOR.
R. F. JAMES.
BY
M. F. Reges
ATTORNEY.

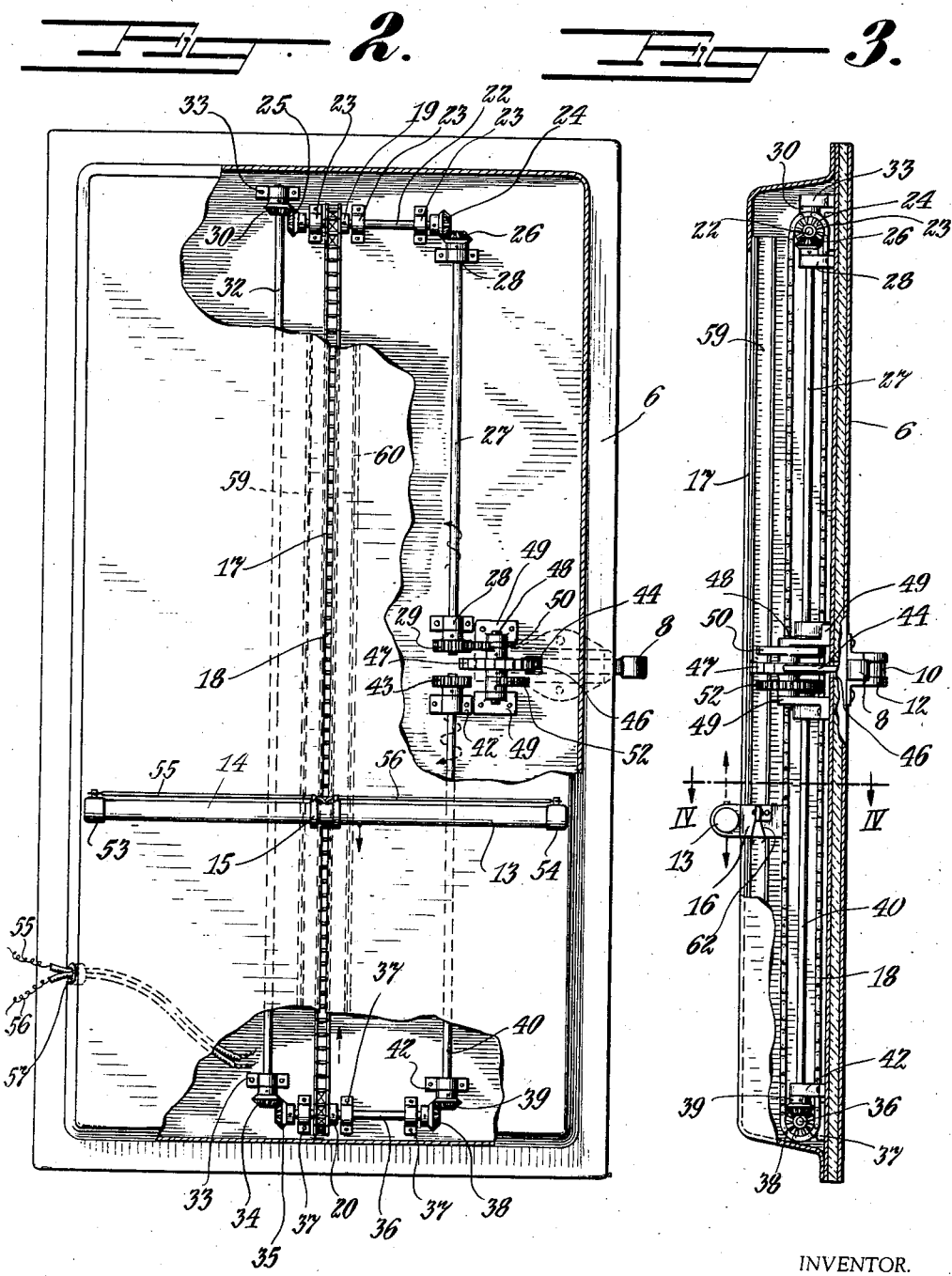

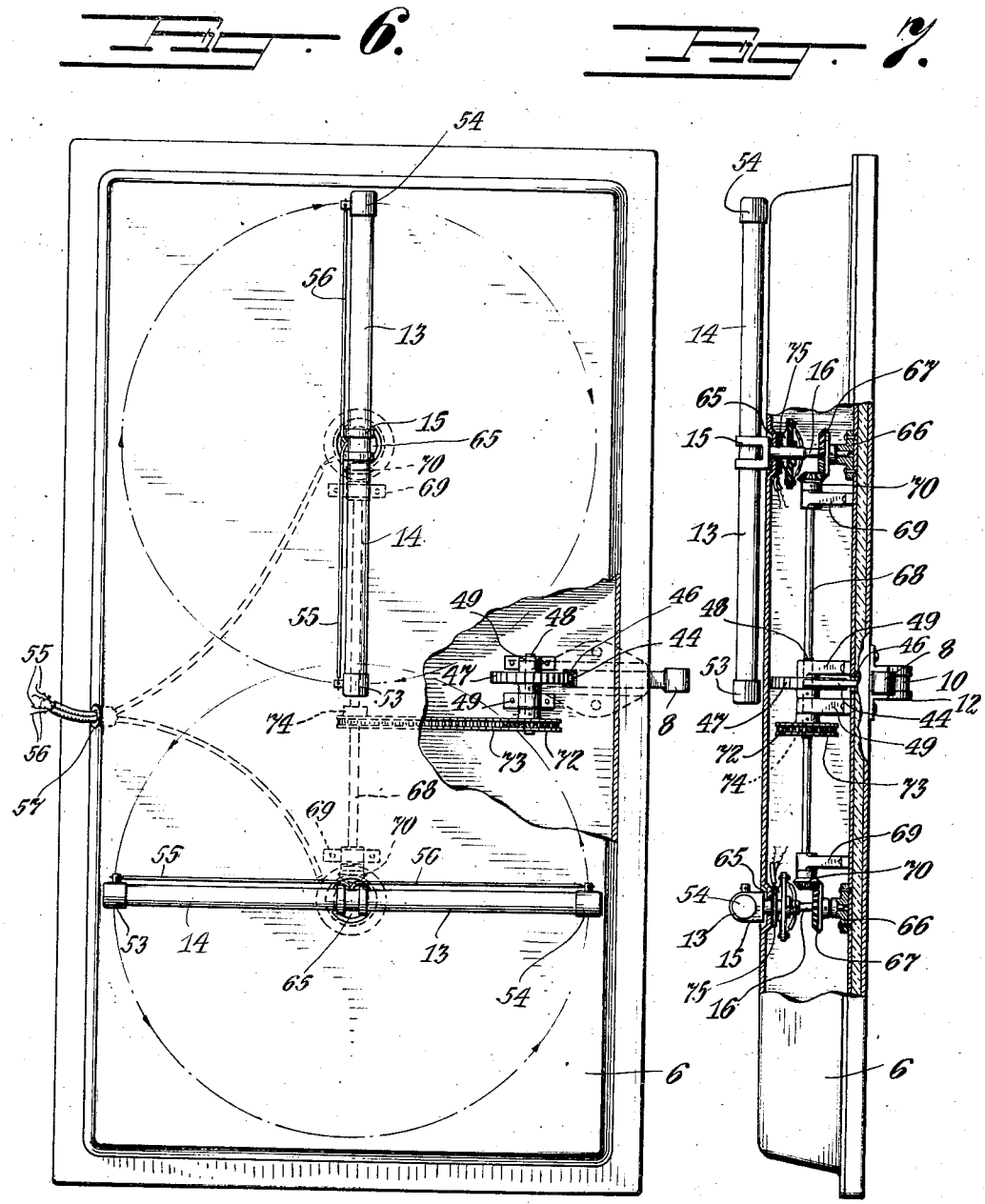

Patented Oct. 26, 1937

2,096,746

UNITED STATES PATENT OFFICE 2,096,746

FOOD PRESERVING APPARATUS

Robert F. James, Mahwah, N. J., assignor, by mesne assignments, to Westinghouse Electric and Manufacturing Company, East Pittsburgh, Pa., a corporation of Pennsylvania Application September 28, 1935, Serial No. 42,559

7 Claims. (Cl. 99—247)

My present invention relates to apparatus adapted for use in the treatment of articles and particularly food products with ultra-violet radiations to maintain the same in a sterile condition free from mold and bactericidal growths, and the present application constitutes a continuation in part of my application Serial No. 566,129, filed September 30, 1931.

The refrigeration of food products to prevent spoilage has long been known but such treatment serves only to retard the surface growths of bacteria, fungi, and yeasts. Accordingly, even with refrigeration, wastage occurs due to these growths and if the products are kept for long periods of time complete spoilage will ultimately result. It is equally well known at the present time that ultra-violet radiations have a sterilizing effect by killing these detrimental surface growths and it has been heretofore proposed to utilize an ultra-violet generator in a refrigerator for the purpose of preventing the growth of bacteria and mold.

However, attempts to employ ultra-violet generators of the prior art in conjunction with refrigeration of food products, such as in domestic refrigerators or the like, has given rise to numerous detrimental results despite the fact that such can generate light of wave lengths which kill bacteria. Operation of these generators or lamps is usually accompanied by considerable generation of heat which affects the refrigerating temperatures and thus imposes a heavy load upon the compressor. A still further inherent characteristic making such ultra-violet generators impractical for refrigerators resides in the fact that the radiations cause ionization of the surrounding air with resulting formation of ozone.

Inasmuch as this ozone is absorbed by food products, a detrimental chemical reaction frequently ensues, or they are otherwise rendered unpalatable or uneatable, due to this ozone or direct chemical reaction although maintained free of bacteria and mold. Thus, the beneficial action of ultra-violet in inhibiting such growths is more than offset by the resulting detrimental action.

It is accordingly an object of my present invention to provide a food preserving container for refrigerating food products wherein such products are subjected to a source of highly bactericidal radiations of low intensity which inhibits the surface growth of molds and bacteria without appreciable generation of heat or deleteriously affecting the refrigerating temperature of the container by imposing an additional load upon the refrigerating mechanism.

Another object of my present invention is the provision of a container for refrigerating food products wherein a source of highly bactericidal radiations of low intensity, is utilized to inhibit the surface growth of bacteria and molds which is operative without an appreciable amount of heat generation or the production of a detrimental chemical reaction to the surrounding medium or food products, such as would render the latter unpalatable or uneatable.

A further object of my invention is the provision of a container for refrigerating food products wherein a source of highly bactericidal radiations of low intensity is utilized to inhibit the surface growth of bacteria and mold on such food products and to eliminate the odors normally present in refrigerators, and the ultra-violet source is operative without appreciable generation of heat so as to impose no additional load on the refrigerating mechanism or cause the production of a detrimental chemical reaction in the food products stored in the refrigerator as would render the same unpalatable or uneatable.

A still further object of my present invention is the provision of a container for refrigerating food products, wherein a source of highly bactericidal radiations is utilized to inhibit the surface growth of bacteria and molds, which source is operative without a substantial amount of heat generation or the production of a detrimental chemical reaction to in surrounding medium or food products stored in the container, and, due to the utilization of such source of radiations, the temperature of the refrigerator may be substantially raised to effect higher humidity and lower dehydration of the food products, thus requiring a smaller refrigerating unit without affecting the preservation of the food products.

Another object of my present invention is the provision of a container for food products wherein the same are irradiated by a source of highly bactericidal ultra-violet light of a predetermined intensity and lying within a predetermined portion of the spectrum, so that the generation of the radiations is unaccompanied by the generation of appreciable heat or ozone, thus causing no detrimental effect on the food products stored within the container.

A further object of my invention is the provision of a container for storing food products or articles and subjecting such products to the bactericidal effects of ultra-violet rediations, together with the provision of distributing such radiations substantially uniformly over the products interiorly of the container by means of the radiation generator.

Still further objects of my present invention will become obvious to those skilled in the art by reference to the following description taken in conjunction with the accompanying drawings showing two embodiments which my invention may take, wherein:

Figure 1 is a fragmentary sectional view of a food container, such as a domestic refrigerator, constructed in accordance with my present invention, Fig. 2 is an elevational view, with parts thereof broken away, of a portion of the container shown in Fig. 1, Fig. 3 is a side view, with parts thereof broken away, of the device as shown in Fig. 2, Fig. 4 is a sectional fragmentary view on an enlarged scale and taken on the line IV—IV of Fig. 3, Fig. 5 is a fragmentary sectional view similar to Fig. 1 and showing a slightly modified form which my present invention may take, Fig. 6 is an elevational view, with parts thereof broken away, of the same modification as shown in Fig. 5, Fig. 7 is a side elevational view, with parts thereof broken away, of the device as shown in Fig. 6, and Fig. 8 is a fragmentary sectional view on an enlarged scale of a portion of the modification shown in Fig. 7.

Referring now to the drawings in detail, I have shown in Fig. 1 a food container 5 which may, as illustrated, be a refrigerated container of any desired character, such as a domestic refrigerator, having the usual insulating walls and a suitable refrigerating unit (not shown). In accordance with the usual practice, this container is provided with a door 6 hinged at one side 7 and provided with a slidably mounted latch 8 which is engageable with a suitable keeper 9 affixed to the container 5. In order to actuate the latch 8, a handle 10 is provided which, when swung outwardly about a pivot 12, releases the latch from the keeper 9, by means of the engaging extension shown in Fig. 1, to permit opening of the door 6.

An ultra-violet generator 13 is shown mounted upon the inner surface of the door 6, in a manner hereinafter described, and comprises a tubular envelope 14 of ultra-violet transmitting material having a transmission characteristic which absorbs substantially all those radiations of a wave length below 2500 Angstrom units and transmits a preponderance of radiations lying between 2500 and 3100 Angstrom units, such for example, as a boro-silicate glass free from iron and known to the art as Corning 972, high transmission ultra-violet glass, which is a form of Corex glass. A lamp of the type here shown is fully shown and described in my application Serial No. 532,655, filed April 24, 1931, but now abandoned, the subject matter of which is covered by my copending application Serial No. 734,620, filed July 11, 1934, and is capable of producing ultra-violet radiations of a predetermined intensity and within a predetermined portion of the spectrum, without a substantial amount of heat radiation or the formation of a sufficient amount of ozone to cause a detrimental chemical reaction in the surrounding medium or the material being treated.

As set forth more in detail in my above noted pending application, the lamp or generator 13 is provided with a suitable gaseous medium which may comprise an admixture of approximately 60% neon and 40% argon together with a small quantity of mercury, such that there will be no appreciable excess thereof with an accompanying deposit on the interior of the envelope as would cause substantial absorption of ultra-violet radiations. By a proper selection of the envelope material, as above noted, as well as current density of operation, envelope thickness and diameter, and applied voltage, a "cold" operating lamp is produced, especially adaptable for the treatment of food products, which may be utilized in a domestic refrigerator or the like.

For optimum operating conditions in a refrigerator, where a great variety of food products are stored, I find that the most successful and efficient operation is obtained with a lamp having an envelope consisting of the above noted material and gaseous admixture with an envelope diameter of 12 millimeters, and wall thickness of 1 millimeter. With a current of 30 milliamperes and an operating voltage of not greater than 450 volts, as measured by an electrostatic voltmeter across the electrodes, ultra-violet radiations are produced of highly bactericidal character lying within the spectral range between 2500 and 3100 Angstrom units. In addition, the generation of these highly bactericidal radiations is unaccompanied by appreciable heat generation or a detrimental chemical reaction to the surrounding medium or material being treated, such as the formation of ozone, which would otherwise directly or indirectly affect food products and render them unpalatable and/or uneatable.

Inasmuch as my novel ultra-violet generator produces substantially no heat and might be called a "cold" lamp, it can be installed in domestic refrigerators without detrimentally affecting their normal refrigerating temperatures, by imposing an appreciable load upon the usual compressor as the total energy of the lamp does not entirely resolve into heat. However, it is of considerable significance that by the utilization of a generator of the type above described, not only is the surface growth of molds and bacteria inhibited, but the refrigerating temperatures of the container may be materially raised.

For instance, while the normal refrigerating temperatures range from 45° to 50° F., I have found by actual tests that the operating temperatures of the refrigerator may be raised to a range approximately between 60° and 65° F. with an even greater degree of food preservation.

Not only is the surface growth of bacteria inhibited, as just noted, but the permissible increase in temperature enables the utilization of a smaller size refrigerating mechanism thus effecting a material saving in refrigerator costs alone. Also I have found an additional savings results in the food products themselves, not only from the elimination of mold and bactericidal growths, but due to the higher humidity inherently present at this higher temperature, there is lower dehydration of the food products giving rise to less wastage by maintaining them in their natural state for longer periods of time with enhanced preservation. Even at such increased temperatures, by the utilization of my ultra-violet lamp, there is an entire absence of vermin and the customary musty so-called "ice box odor" in the refrigerator which constitutes a still further advantageous feature inherent in the device.

The ultra-violet generator 13 is mounted on the inner surface of the door 6 for movement relative to the interior of the container or refrigerator 5 so as to uniformly distribute the radiations over all the food products when stored upon the usual shelves. A bracket 15 supports the generator 13 substantially at its center and this bracket is in turn provided with a stem 16 slidably received in a vertical slot 17 formed in the inner surface of the door 6. The stem 16 is rigidly secured to a suitable flexible member, such as a chain or the like 18, which member 18 engages suitable sprocket gears or wheels 19 and 20 mounted adjacent the upper and lower ends respectively of the door 6.

The sprocket gear 19 is carried by a short shaft 22 which is journaled in suitable bearings 23 affixed to the container door 6. At its ends the shaft 22 carries a pair of bevel gears 24 and 25. The gear 24 is mounted so as to be engaged by another bevel gear 26 carried by the upper end of a vertical shaft 27, which is suitably journaled in bearings 28 also affixed to the container door. The lower end of this vertical shaft 27 is provided with a gear or pinion 29 for a purpose to be hereinafter more fully described.

The bevel gear 25 is also so positioned as to engage a bevel gear 30 carried by the upper end of another vertical shaft 32, likewise journaled in suitable bearings 33 carried by the door 6, as can be more fully seen in Fig. 2. The lower end of this shaft 32 carries a bevel gear 34 engaging another bevel gear 35 affixed to one end of a short horizontal shaft 36 to which the sprocket gear 20 is also affixed. This latter shaft 36 is maintained in position by suitable bearings 37 and at its opposite end is provided with another bevel gear 38 engaging a further bevel gear 39 carried by the lower end of a vertical shaft 40, which is maintained in alignment with the shaft 27 by suitable bearings 42. The upper end of this vertical shaft 40 is also provided with a gear or pinion 43 similar to the gear 29 but spaced therefrom as seen in Figs. 2 and 3.

It will thus be observed that the several bevel gears and shafts provide in substance a gear train and the arrangement is such that when the gear 29 is rotated in one direction, such as shown by the arrow in Fig. 2, the gear 43 will, through the train of gearing, rotate in an opposite direction with the shaft 40 rotating opposite to that of the shaft 27 also as shown by the arrow in Fig. 2.

In order to impart movement of the gear train as above described, so as to effect a vertical reciprocatory movement of the generator 13, the handle 10 is provided with a pawl 44 attached thereto at a distance from the point of pivoting said handle to the door, as indicated at 45, and extending through a suitable opening 46 provided in the door 6, as can be more readily seen in Fig. 1. This pawl 44 is associated with the handle 10 so that it engages the teeth of a ratchet gear 47, which is affixed to a short shaft 48, this shaft being vertically journaled in suitable bearings 49, as the handle is pulled out to disengage the latch 8 from its keeper 9, but slips over said teeth when the handle is pushed back to lock the door. Rigidly affixed to the shaft 48 are two gear segments 50 and 52 disposed above and below the ratchet gear or wheel 47, respectively, with these gear segments being preferably of 180° extent and arranged on opposite sides of the axis of the shaft 48. The gear segment 50 is so positioned as to engage the gear 29 and similarly the gear segment 52 engages the gear 43 with the result that when the ratchet gear 47 is rotated, the gears 29 and 43 will be alternately driven by the gear segments 50 and 52, respectively.

In operation, each time the handle 25 is moved to release the catch 8, a partial rotation will be imparted to the ratchet gear 47 and to the gear segments 50 and 52. Either the gear 29 or the gear 43 will be rotated, depending upon which gear segment is in engagement with its respective gear, it being obvious from the description and drawings that when the gear segment 50 is in engagement with the gear 29, the gear segment 52 will be out of engagement with the gear 43, as shown in Fig. 2. Thus by alternately driving the gears 29 and 43 in the same direction of rotation, movement will be imparted to the gear train in opposite directions and the inner section of the flexible member 18 will be reciprocated to effect like movement of the generator 13.

If, for example, the gear segment 50 is in engagement with the gear 29, shaft 27 will be rotated in the direction indicated by the arrow in Fig. 2, and the chain 18 will be moved downward to impart downward movement to the generator 13. When the generator reaches substantially the bottom of the door 6 and the lower extremity of the slot 17, the gear segment 50 will have been moved out of engagement with the gear 29, and the gear segment 52 will then have moved into engagement with the gear 43. Continued rotation of the ratchet gear 47 will then effect a movement of the chain 18 to return the generator 13 to its uppermost position.

It can thus be readily seen that movement of the ultra-violet generator in the food container is such that an even distribution of the radiation is effected over the entire contents. Movement of the generator is entirely automatic in its operation and, in the embodiment just described, will be intermittently effected by actuation of the handle by which the container door is opened. In order to supply electrical energy to the lamp from an appropriate source (not shown) during its reciprocatory movement, the electrodes 53 and 54 are connected by means of suitable conductors 55 and 56 to such source. These conductors may extend through an opening 57 in the container and an opening 58 in the bracket 15, as shown more clearly in Fig. 4, and be connected directly to the electrodes with sufficient slack to permit movement of the device. Preferably, however, to prevent these conductors becoming entangled in the gear train, I break the same and connect them to a pair of insulatingly supported metallic channel members 59 and 60 extending vertically of the door 6 adjacent the vertical slot 17, as shown in Fig. 4.

A pair of insulatingly mounted metallic brushes 62 and 63 are in turn supported by the stem 16, and the portion of the conductors 55 and 56 connected to the electrodes 53 and 54 and which pass through the openings 58 in the bracket 15, are connected to these brushes 62 and 63. Inasmuch as these brushes are maintained in contact with the metallic channel members 59 and 60, electrical energy from the source (not shown) is supplied to the generator 13 in all its positions during movement thereof.

Referring now more particularly to Figs. 5 to 8 of the drawings, a slightly modified form of construction is disclosed in which two ultra-violet light generators 13 are shown mounted for rotation, rather than reciprocation as in the modification just described, and which are positioned near the upper and lower ends of the door 6. Both these generators 13 are again supported substantially centrally thereof by the brackets 15 to which the stems 16 are secured. In this modification, however, the stem 16 of each bracket is journaled in suitable bearings 65 and 66 secured to the door 6, as shown more clearly in Figs. 7 and 8. The stem 16 in this instance thus constitutes a shaft and has rigidly secured thereto a bevel gear 67. In lieu of the several shafts employed in the previously described embodiment, a single vertical shaft 68 is suitably journaled in bearings 69 and disposed substantially in the center of the door 6. This shaft 68 is provided with bevel gears 70 disposed on each of its ends which engage with the bevel gears 67 carried by the respective stems or shafts 16.

As in the previously described modification, the handle 10 has a pawl 44 pivoted thereto at 45, which pawl engages a ratchet gear 47 carried by a short shaft 48 and journaled in the bearings 49. Also affixed to this shaft 48, in lieu of the segmental gears 50 and 52, is a sprocket gear 72, and a flexible member such as a chain 73 connects this gear 72 to a similar sprocket gear 74 affixed to the shaft 68. Thus, upon intermittent rotation of the ratchet gear 47, by pulling upon the handle 10, the shaft 68 is rotated due to the connection of the sprocket gear 74 with the sprocket gear 72 through the medium of the chain 73, which latter sprocket gear 72 is affixed to the same shaft 48 as is the ratchet gear 47. Consequently upon rotation of the shaft 68 there will be attendant rotation of the bevel gears 70 and these, being in turn in engagement with the bevel gears 67, cause rotation of the stems 16 together with that of the respective generators 13 to effect an even distribution of the ultra-violet radiation throughout the interior of the container 5.

It should also be noted that the pivot points of the respective generators 13, formed by the brackets 15 and stem 16, is so located with respect to each other and the extremities of the door 6, and these generators are so positioned angularly with respect to each other that they freely rotate without interference or contact either with the container or each other.

Also in order to supply the energy for the lamp during their rotation a slight modification is made from that previously described. In this latter embodiment the conductors 55 and 56 again pass through the opening 57 provided in the door 6 and are connected to a bi-polar collector ring or the like 75 which is insulatingly supported and surrounds the respective stems 16.

The metallic brushes 62 and 63 are again insulatingly supported by the respective stems 16 but are of a slightly different configuration as seen in Fig. 8. However, these brushes are maintained in wiping engagement with the metallic parts of the respective stationary collector rings 75, and being connected to the electrodes 53 and 54 of the respective generators 13, by the conductors 55 and 56 which extend through the opening 58 provided in the bracket 15 and stem 16, they transmit the electrical energy from the suitable source (not shown) to the lamps during their rotation, in somewhat an analogous manner as previously described.

From the foregoing it will thus become obvious to those skilled in the art that I have provided a container for housing of food products wherein such products are subjected to a source of highly bactericidal radiations of a predetermined intensity and wave length. Moreover, the generated ultra-violet radiations are such as to inhibit the growth of bacteria and fungi heretofore inherently present in the refrigeration of food products. Also due to the fact that with my novel ultra-violet generator the radiations are unaccompanied by an appreciable amount of heat generation, and may thus be said to constitute a "cold" source of ultra-violet light, the refrigerating temperatures of the device are not detrimentally affected so as to impose an additional load on the refrigerating mechanism.

This feature, together with the radiations being of such an intensity as to not cause a chemical reaction in the surrounding medium, eliminates the formation of ozone which otherwise results in such reaction affecting food products, rendering them unpalatable and uneatable.

Moreover by the utilization of my generator I have established the fact that the normal refrigerating temperatures may be raised substantially, thus effecting a savings both in refrigerating costs and food wastage, with the food products being maintained in an even better state of natural preservation for longer periods of time. To better distribute the radiations from the source of ulta-violet light over the food products within the refrigerator, said source may be automatically moved upon operation of the container door.

Although I have shown and described several embodiments of my present invention, I do not desire to be limited thereto as other modifications thereof may be made without departing from the spirit and scope of the appended claims.

What is claimed:

1. A device for storing and preserving food comprising a container with an opening, a door with an edge portion hinged to said container for closing said opening, a latch slidably mounted on said door, a keeper on said container engageable by an end portion of said latch for holding said door closed over said opening, a handle pivoted to said door and formed with an extension cooperating with said latch for moving it into and out of engagement with said keeper, a pawl with one end portion attached to said handle at a distance from the point of pivoting said handle and door, so as to be reciprocated thereby, a ratchet wheel movably mounted on said door and rotatable step by step upon engagement by the other end of said pawl, ultra-violet light generating means movably mounted on the inner side of said door, and means connecting said ratchet wheel and generating means, whereby as said wheel is itermittently rotated by said pawl, upon operation of the door handle and latch as the door is opened and closed, said generating means is moved, step by step, from one position to another on said door, so as to effect uniform irradiation of the interior of said container.

2. A device for storing and preserving food comprising a container with an opening, a door with an edge portion hinged to said container for closing said opening, a latch slidably mounted on said door, a keeper on said container engageable by an end portion of said latch for holding said door closed over said opening, a handle pivoted to said door and formed with an extension cooperating with said latch for moving it into and out of engagement with said keeper, a pawl with one end portion attached to said handle at a distance from the point of pivoting said handle and door, so as to be reciprocated thereby, a ratchet wheel movably mounted on the inner side of said door and rotatable step by step upon engagement by the other end of said pawl, complementary gear segments, each 180° in extent, operable with said ratchet wheel, and alternately engaging gears mounted on adjacent ends of normally vertical shafts, the opposite ends of said shafts being geared to normally horizontal shafts carrying sprocket wheels and respectively disposed near upper and lower edges of said door, a chain passing around and engaging said sprocket wheels, ultra-violet light generating means carried on the inner side of said door for vertical reciprocation therealong, and means connecting said generating means to the inner section of said chain, whereby as said wheel is intermittently rotated by said pawl, upon operation of the door handle and latch, said generating means is moved step by step between the top and bottom of said door, first in one direction and then the other, so as to effect a greater uniformity of irradiation of the interior of said container.

3. A device for storing and preserving food comprising a container with an opening, a door with an edge portion hinged to said container for closing said opening, a latch slidably mounted on said door, a keeper on said container engageable by an end portion of said latch for holding said door closed over said opening, a handle pivoted to said door and formed with an extension cooperating with said latch for moving it into and out of engagement with said keeper, a pawl with one end portion attached to said handle at a distance from the point of pivoting said handle and door, so as to be reciprocated thereby, a ratchet wheel movably mounted on said door and rotatable step by step upon engagement by the other end of said pawl, a sprocket wheel movable with said ratchet wheel, a normally vertical shaft rotatably mounted on said door and carrying another sprocket wheel, a chain passing around and engaging said sprocket wheels for transmitting motion to said normally vertical shaft, a pair of rotatably mounted shafts extending normal to said door, ultra-violet light generating means comprising a pair of elongated units mounted on the inner end of said shafts and disposed approximately at right angles to one another, and gearing for transmitting motion between said vertical shaft and said normally extending shafts, whereby as said ratchet wheel is intermittently rotated by said pawl, upon operation of the door handle and latch, said generating means is rotated step by step from one position to another on said door, so as to effect more uniform irradiation of the interior of said container.

4. A device for storing and preserving food comprising a container with an opening, a door hinged to said container for closing said opening, latch means holding said door in closed position, ultra-violet light generating means movably mounted on the inner side of said door, and mechanism connecting said latch and generating means for automatically effecting step by step movement of the latter as the door is unlatched and latched upon opening and closing thereof, so as to periodically change the position of said generating means and provide for the more uniform irradiation of the interior of said container.

5. A device for storing and preserving food comprising a container with an opening, a door with an edge hinged to said container for closing said opening, a latch slidably mounted on said door, a handle pivoted to said door and formed with an extension cooperating with said latch for moving it into locked and unlocked positions, a pawl with one end portion attached to said handle at a distance from the point of pivoting said handle and door, so as to be reciprocated thereby, a ratchet wheel movably mounted on said door and rotatable step by step upon engagement by the other end of said pawl, ultra-violet light generating means movably mounted on the inner side of said door, and means connecting said ratchet wheel and generating means, whereby as said wheel is intermittently rotated by said pawl, upon operation of the door handle and latch as the door is opened and closed, said generating means is moved, step by step, from one position to another on said door, so as to effect uniform irradiation of the interior of said container.

6. A device for storing and preserving food comprising a container with an opening, a door with an edge portion hinged to said container for closing said opening, a latch slidably mounted on said door, a handle pivoted to said door and formed with an extension cooperating with said latch for moving it into locked and unlocked positions, a pawl with one end portion attached to said handle at a distance from the point of pivoting said handle and door, so as to be reciprocated thereby, a ratchet wheel movably mounted on the inner side of said door and rotatable step by step upon engagement by the other end of said pawl, complementary gear segments, each 180° in extent, operable with said ratchet wheel, and alternately engaging gears mounted on adjacent ends of normally alined shafts, the opposite ends of said shafts being geared to generally parallel shafts carrying sprocket wheels and respectively disposed near upper and lower edges of said door, a chain passing around and engaging said sprocket wheels, ultra-violet light generating means carried on the inner side of said door for vertical reciprocation therealong, and means connecting said generating means to said chain, whereby as said wheel is intermittently rotated by said pawl, upon operation of the door handle and latch, said generating means is moved step by step between the top and bottom of said door, first in one direction and then the other, so as to effect a greater uniformity of irradiation of the interior of said container.

7. A device for storing and preserving food comprising a container with an opening, a door with an edge portion hinged to said container for closing said opening, a latch slidably mounted on said door, a handle pivoted to said door and formed with an extension cooperating with said latch for moving it into locked and unlocked positions, a pawl with one end portion attached to said handle at a distance from the point of pivoting said handle and door, so as to be reciprocated thereby, a ratchet wheel movably mounted on said door and rotatable step by step upon engagement by the other end of said pawl, a sprocket wheel movable with said ratchet wheel, a shaft rotatably mounted on said door and carrying another sprocket wheel, a chain passing around and engaging said sprocket wheels for transmitting motion to said shaft, a rotatably mounted shaft extending normal to said door, ultra-violet light generating means mounted on the inner end of said shaft and gearing for transmitting motion between said shafts, whereby as said ratchet wheel is intermittently rotated by said pawl, upon operation of the door handle and latch, said generating means is rotated step by step from one position to another on said door, so as to effect more uniform irradiation of the interior of said container.

ROBERT F. JAMES.